United States Patent
Joest et al.

Patent Number: 5,810,393
Date of Patent: Sep. 22, 1998

[54] STEERING COLUMN SUPPORT FOR A MOTOR VEHICLE

[75] Inventors: Rainer Joest, Muehlacker; Clemens Mutter, Keltern; Erwin Goetz, Weil der Stadt, all of Germany

[73] Assignee: Dr. Ing. h.c.F. Porsche AG, Weissach, Germany

[21] Appl. No.: 764,519

[22] Filed: Dec. 12, 1996

[30] Foreign Application Priority Data

Dec. 21, 1995 [DE] Germany .......................... 195 47 858.4
Feb. 14, 1996 [DE] Germany .......................... 196 05 370.6

[51] Int. Cl.$^6$ .................................................. B62D 25/08
[52] U.S. Cl. ............................................ 280/779; 280/750
[58] Field of Search .................................... 280/750, 751, 280/752, 779; 296/189

[56] References Cited

U.S. PATENT DOCUMENTS

| | | | |
|---|---|---|---|
| 4,355,820 | 10/1982 | Kitagawa et al. | 280/779 |
| 4,400,011 | 8/1983 | Matsuno | 280/751 |
| 4,682,788 | 7/1987 | Yoshimura | 280/779 |
| 5,238,286 | 8/1993 | Tanaka et al. | 280/779 |
| 5,282,637 | 2/1994 | McCreadie | 280/779 |

FOREIGN PATENT DOCUMENTS

| | | |
|---|---|---|
| 0 440 898 | 8/1991 | European Pat. Off. . |
| 34 19 002 A1 | 11/1985 | Germany . |
| 41 05 679 | 8/1991 | Germany . |
| 41 34 436 | 4/1992 | Germany . |
| 2 159 313 | 6/1972 | Italy . |
| 2 065 038 | 6/1981 | United Kingdom . |

*Primary Examiner*—Daniel D. Wasil
*Attorney, Agent, or Firm*—Evenson, McKeown, Edwards & Lenahan, P.L.L.C.

[57] ABSTRACT

A steering column support for a motor vehicle includes a steering column unit, a cross member supporting the steering column unit, at least one reinforcing strut connected with the cross member, and a receiving element for a knee restraint connected with the reinforcing strut(s) and the steering column unit. The steering column support controls and prevent undesirable vibration of the steering wheel.

15 Claims, 2 Drawing Sheets

STEERING COLUMN SUPPORT FOR A MOTOR VEHICLE

BACKGROUND AND SUMMARY OF THE INVENTION

This invention relates to a motor vehicle frame structure, and more particularly to a steering column support for a motor vehicle.

The steering wheel of a motor vehicle may shake or vibrate during operation of the vehicle due to various causes. For example, steering wheel vibrations may be caused by unbalanced or improperly aligned vehicle wheels, by vibrations caused by drivetrain components such as the engine, transmission, or brake system, or by variations in the road surface which are transmitted through the vehicle wheels and steering system to the steering column and the steering wheel. Such vibrations in the steering wheel are not only annoying to the vehicle driver, but may cause safety problems.

Therefore, there is a need for a support for a steering column of a motor vehicle which supports and reduces vibrations in the steering column and steering wheel, and which can be easily constructed and assembled.

These and other needs have been met according to the present invention by providing a steering column support for a motor vehicle, comprising: a steering column unit; a cross member supporting the steering column unit; at least one reinforcing strut connected with the cross member; and a receiving element for a knee restraint connected with the at least one reinforcing strut and the steering column unit.

According to the present invention, the steering column unit is connected with reinforcing struts by way of a steering column support which is formed by a receiving element for a knee restraint. For this purpose, the receiving element is lengthened longitudinally to form the steering column support which is connected at a longitudinal end with a steering column unit. Such a steering column support can be easily constructed and assembled.

The receiving element is preferably constructed as a shell-shaped part and is connected along a large base with the reinforcing struts of the vehicle body so that a stiff junction point for the steering column support is obtained between the reinforcing struts, and trembling motions of the steering column unit are effectively eliminated. By way of their fastenings, the reinforcing struts can be used for the compensation of tolerances.

According to one aspect of the present invention, the receiving element may be formed with an angular cross-section, i.e., having at least two legs, in order to provide an advantageous sturdy and stable construction. According to a preferred embodiment of the invention, only one leg of the angular receiving element is used for forming the steering column support, which leg is constructed with a rounded edge or a radius.

For reducing the weight of the steering column support and of the receiving element, recesses can be provided in the receiving element, for example in the form of longitudinal slots.

Although the steering column support is preferably fastened to the steering column unit with threaded connectors, it may be connected in any known manner, including non-threaded connectors, gluing, welding or the like. The steering column support is connected on its end proximate the steering column unit with a plate or the like which has a supporting surface with respect to the protective steering tube of the steering column unit.

These and other objects, features and advantages of the present invention will become more readily apparent from the following detailed description when taken in conjunction with the accompanying drawings.

DETAILED DESCRIPTION OF THE DRAWINGS

Figure 1:
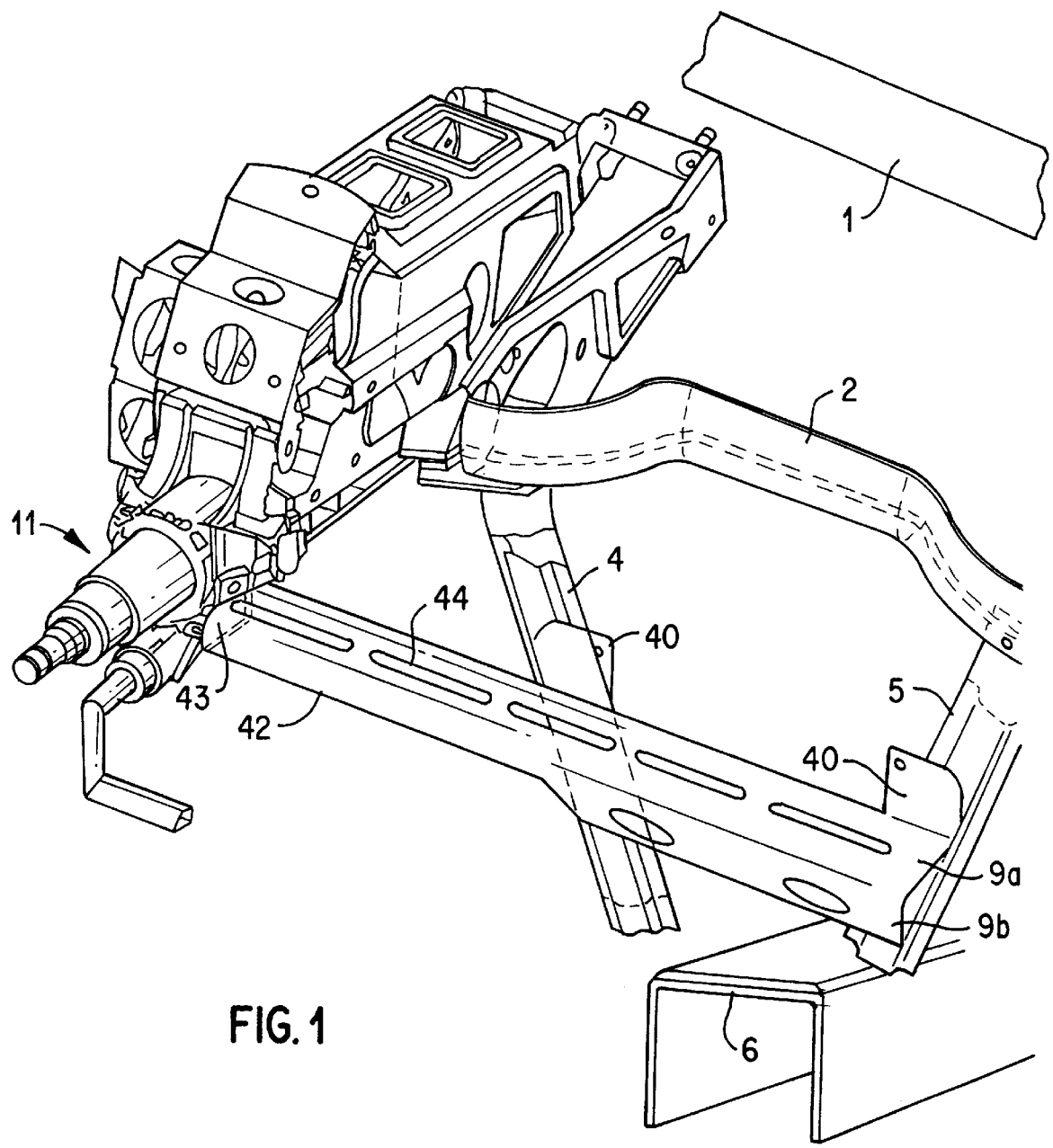
FIG. 1 is a schematic perspective view of a steering column support according to a preferred embodiment of the present invention.
Figure 2:
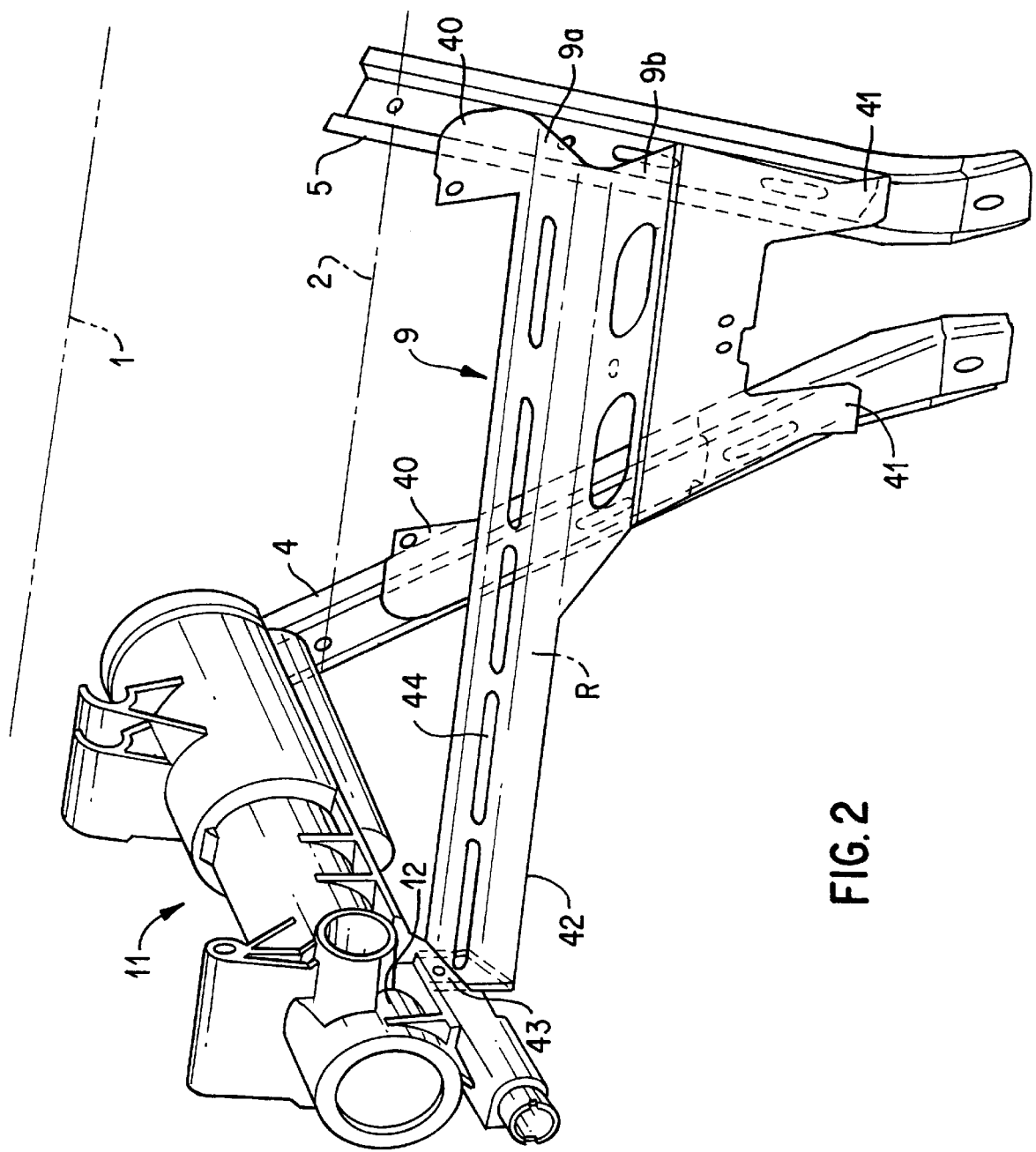
FIG. 2 is a close-up view of the steering column support.

Referring to FIGS. 1–2, a frame cross member 1 of a windshield is arranged between forward body columns (not shown) of a motor vehicle. In FIG. 2, the frame cross member 1 is shown as a dash-double dotted line. A receiving element 9 for a knee restraint is arranged below the frame cross member 1. The receiving element 9 is connected with reinforcing struts 4, 5, for example with threaded or non-threaded connectors, by gluing or by welding. Upper ends of the reinforcing struts 4,5 are fastened to a cross member 2, for example with threaded or non-threaded connectors, by gluing or by welding. The cross member 2 carries a bearing block for the steering column unit 11 and thereby provides support for the steering column unit. In FIG. 2, the cross member 2 is shown as a dash-dotted line. Lower ends of the reinforcing struts 4,5 are fastened to a transmission tunnel 6, for example with threaded or non-threaded connectors, by gluing or by welding.

The receiving element 9 comprises an angular profile with a first leg 9a situated approximately in a horizontal plane and with a second leg 9b pointing downward from an edge of the first leg 9a. Preferably, the second leg 9a is inclined diagonally downward from a rear edge of the first leg 9a. The receiving element 9 is basically constructed in the form of a shell, with arms 40 and arms 41 which extend away from each leg 9a, 9b of the angular profile and which are each connected with the reinforcing struts 4, 5, respectively, for example with threaded or non-threaded connectors, by gluing or by welding.

The receiving element 9 has the above-mentioned angular profile in a section between the two reinforcing struts 4, 5. One of the legs 9a or 9b of the angular profile extends as a support 42 to the steering column unit 11 and is fixedly connected therewith, for example with threaded or non-threaded connectors, by gluing or by welding.

As illustrated in detail in FIG. 2, the first leg 9a of the angular profile which is situated approximately in the horizontal plane extends between the reinforcing strut 4 and the steering column unit 11 to form the support 42. The second leg 9b extends only between the reinforcing struts 4, 5. The front edge of the support 42 is formed with a radius R, effectively providing additional support in this area where the second leg 9b is not present.

The support 42 is connected with the steering column unit 11 on the protective steering tube 12 by way of an end-side plate 43 of the support 42 which is fastened to the protective steering tube 12, for example with threaded or non-threaded connectors, by gluing or by welding.

In order to reduce the weight of the receiving element 9 and of the support 42, several holes or recesses 44 may be formed in the receiving element, for example in the form of longitudinal slots.

The receiving element 9 is a component of the vehicle body frame structure, and therefore no further supporting strut is required which may have an interfering effect with respect to the space. The receiving element 9 including the support 42 is covered by the knee restraint.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering column support for a motor vehicle, comprising:

a steering column unit;

a cross member supporting said steering column unit;

at least one reinforcing strut connected with said cross member; and a receiving element for a knee restraint connected with said at least one reinforcing strut and said steering column unit.

2. A steering column support according to claim 1, wherein said at least one reinforcing strut is fastened to a transmission tunnel of the motor vehicle.

3. A steering column support according to claim 1, wherein said cross member is arranged below a windshield frame cross member of the motor vehicle.

4. A steering column support according to claim 1, wherein said at least one reinforcing strut comprises two reinforcing struts located at a distance from each other.

5. A steering column support according to claim 1, wherein the receiving element comprises a shell which has arms extending from the receiving element, said arms each being connected with the at least one reinforcing strut.

6. A steering column support according to claim 1, wherein the receiving element comprises an angular profile including a first leg extending approximately in a horizontal plane and an adjoining second leg inclined diagonally downward.

7. A steering column support according to claim 4, wherein the receiving element comprises an angular profile including a first leg extending approximately in a horizontal plane and an adjoining second leg inclined diagonally downward.

8. A steering column support according to claim 7, wherein said first leg extends between said two reinforcing struts and extends to said steering column unit, and said second leg extends only between said two reinforcing struts.

9. A steering column support according to claim 5, wherein the receiving element comprises an angular profile including a first leg extending approximately in a horizontal plane and an adjoining second leg inclined diagonally downward.

10. A steering column support according to claim 1, wherein said receiving element defines at least one hole or recess.

11. A steering column support according to claim 5, wherein said receiving element defines at least one hole or recess.

12. A steering column support according to claim 6, wherein said receiving element defines at least one hole or recess.

13. A steering column support according to claim 1, wherein said receiving element includes a receiving plate on an end adjacent said steering column unit, said receiving plate being connected to said steering column unit.

14. A steering column support according to claim 5, wherein said receiving element includes a receiving plate on an end adjacent said steering column unit, said receiving plate being connected to said steering column unit.

15. A steering column support according to claim 7, wherein said receiving element includes a receiving plate on an end adjacent said steering column unit, said receiving plate being connected to said steering column unit.

\* \* \* \* \*